United States Patent [19]

Sigal

[11] Patent Number: 4,862,089
[45] Date of Patent: Aug. 29, 1989

[54] METHOD OF MAGNETOTELLURIC EXPLORATION USING A ZIGZAG ARRAY

[75] Inventor: Richard F. Sigal, Tulsa, Okla.

[73] Assignee: Amoco Corporation, Chicago, Ill.

[21] Appl. No.: 248,527

[22] Filed: Sep. 23, 1988

[51] Int. Cl.$^4$ .............................................. G01V 3/08
[52] U.S. Cl. .................................... 324/350; 324/347
[58] Field of Search .............. 324/323, 345, 346, 347, 324/348, 349, 350

[56] References Cited

U.S. PATENT DOCUMENTS

| | | | |
|---|---|---|---|
| 4,286,218 | 8/1981 | Bloomquist et al. | 324/350 |
| 4,591,791 | 5/1986 | Bostick, Jr. | 324/350 |
| 4,757,262 | 7/1988 | Bostick, Jr. | 324/350 |

OTHER PUBLICATIONS

"Basic Theory of the Magneto-Telluric Method of Geophysical Prospecting", Cagniard, Geophysics vol. 18, p. 605 (1953).
"Electromagnetic Array Profiling", Bostick, 50th Annual Meeting, Society of Exploration Geophysicists, pp. 60–61, (1986).

Primary Examiner—Reinhard J. Eisenzopf
Assistant Examiner—Walter E. Snow
Attorney, Agent, or Firm—Timothy D. Stanley

[57] ABSTRACT

The present invention relates generally to a method of geophysical exploration and more particularly to a novel method of magnetotelluric exploration. In one embodiment, a series of continuous electric dipole measurements of one component of the earth's electric field are obtained along a zigzag line. Concurrently, at least two components of the earth's magnetic field are obtained in the vicinity of the zigzag line. Each electric dipole measurement of the earth's electric field comprise measures of the potential difference between electrodes spaced along the zigzag line in which the included angle between adjacent pairs of electric dipole measurements is less than 180°. Preferably, the included angle between adjacent electric dipole measurements is between 90° and 150°.

17 Claims, 2 Drawing Sheets

METHOD OF MAGNETOTELLURIC EXPLORATION USING A ZIGZAG ARRAY

BACKGROUND OF THE INVENTION

The present invention relates generally to the field of geophysical exploration and more particularly to a novel method of magnetotelluric exploration.

Magnetotelluric exploration involves simultaneously measuring and recording the earth's magnetic field and electric field, at the earth's surface, to obtain estimates of the earth's resistivity structure. Historically, magnetotelluric exploration has involved measuring orthogonal components of the earth's magnetic and electric fields at one or more discrete locations as envisioned by Cagnaird in "Basic theory of the magnetotelluric method of geophysical prospecting" Geophysics Vol. 18, p. 605 (1953). As a result of such magnetotelluric surveys, one was able to generate one-dimensional estimates of the earth's resistivity structure for simple plane-layered earth models. Although such magnetotelluric methods required the measurement of both the electric and magnetic fields at each sensing location, it was recognized by those skilled in the art that the earth's magnetic field varies more slowly as a function of spatial location than does the earth's electric field. Consequently, closely spaced magnetotelluric methods often measure the earth's magnetic field less frequently spatially, than the earth's electric field. Present magnetotelluric exploration methods, provide techniques for obtaining two-dimensional and three-dimensional (under limited circumstances), estimates of the earth's resistivity structure by measuring two orthogonal components of the earth's magnetic and electric fields. Nevertheless, present magnetotelluric exploration methods remain discrete surveys of the earth's resistivity structure. That is, electric dipole measurements of the earth's electric field are typically obtained over specified, non-continuous intervals which are too far apart to avoid spatial aliasing.

In an attempt to overcome the spatial aliasing of present magnetotelluric exploration methods, Bostick described in "Electromagnetic Array Profiling," 50th Annual Meeting, Society of Exploration Geophysicists, pages 60–61, (1986), an electromagnetic profiling (EMAP) method whereby continuous, rather than discrete, electric dipole measurements of one component the earth's electric field are made along a substantially straight line of profile and two orthogonal components of the earth's magnetic field are measured at at least one location in the vicinity of the line of profile. Additionally, the EMAP line of profile is aligned generally perpendicular to an assumed strike direction of the earth's formations. As used in the geophysical art, strike is the direction along which the earth's resistivity is generally constant.

Since the EMAP method obtains electric dipole measurements of only one component of the earth's electric field over specified, continuous intervals, the EMAP method can yield only one-dimensional estimates of the earth's resistivity structure. By obtaining a plurality of such one-dimensional estimates along the line of profile and placing them adjacent one another, however, the EMAP method can emulate a two-dimensional profile of the earth's resistivity structure along the line of profile. Unfortunately, if the assumption about the strike direction of the earth's formations is incorrect, the EMAP data collected can be confused and insufficient to make revised estimates of the strike direction or to obtain estimates of the earth's resistivity structure.

Both magnetotelluric and EMAP exploration techniques necessarily involve simultaneously measuring and recording one or more components of the earth's electric and magnetic fields for long periods of time, typically 24 hours, and over extended distances. The deployment of sensors, recording equipment, and their associated cables comprises a substantial portion of the cost of such exploration techniques. Magnetotelluric and EMAP methods of exploration are generally intended to provide a preliminary interpretation of the earth's substructure over the widest area possible. As such, the cost associated with collecting the most information possible over the widest area can be a significant factor to consider when selecting either magnetotelluric or EMAP exploration methods.

The EMAP exploration technique does reduce the number of recording channels (and hence cost) over present magnetotelluric exploration techniques since only one electric dipole component of the earth's electric field is measured and recorded at each sensing location along a line of profile. However, the EMAP technique does increase the length of deployed cable since it obtains continuous, rather than discontinuous, electric dipole measurements of the earth's electric field.

As a consequence of measuring only one electric dipole component of the earth's electric field along the line of profile, the EMAP technique cannot measure the complete impedance tensor along the line of profile as with the conventional magnetotelluric method of exploration nor can the EMAP method determine the strike direction of the earth's formations. Additionally, the EMAP technique cannot truly generate two-dimensional estimates of the earth's resistivity structure. Rather, the EMAP technique generates a continuous series of one-dimensional estimates of the earth's resistivity structure along the line of profile so as to emulate a two-dimensional profile of the earth's substructure. Thus, the EMAP technique barters reduced acquisition and collection costs for reduced information about the earth's resistivity structure.

When compared to the EMAP technique, the present invention provides a method for measuring the complete impedance tensor and determining formation strike direction with only a small increase in a number of recording channels and length of cable. When compared to conventional magnetotelluric techniques, the present invention provides a method of magnetotelluric acquisition which can (for an equivalent amount of data) substantially reduce the number of recording channels and thus the costs of acquisition. Moreover, the magnetotelluric data collected according to the present invention is amenable to both conventional magnetotelluric and EMAP processing techniques. Thus, the present method of magnetotelluric exploration provides a more cost effective way to obtain more complete estimates of the earth's subsurface structure.

SUMMARY OF INVENTION

The present invention relates generally to a method of geophysical exploration and more particularly to a novel method of magnetotelluric exploration. In one embodiment, a series of continuous electric dipole measurements of one component of the earth's electric field are obtained along a zigzag line. Concurrently, at least two components of the earth's magnetic field are obtained in the vicinity of the zigzag line. Each electric dipole measurement of the earth's electric field comprises obtaining a measure of the potential differences between electrodes spaced a selected distance apart along the zigzag line in which the included angle between adjacent pairs of electric dipole measurements is less than 180°. Preferably, the included angle between adjacent electric dipole measurements is between 90° and 150° and the distance between electrode pairs is constant.

The present method of magnetotelluric exploration results in a small increase in a total length of cable and recording channels required to collect magnetotelluric data over that of the EMAP method, which have the same coverage. However, the present magnetotelluric technique is not constrained to acquiring data along lines of profile which run generally perpendicular to an assumed strike direction of the earth's formations, nor is the data collected limited to providing one-dimensional estimates of the earth's resistivity structure. Additionally, the present method of magnetotelluric exploration substantially reduces the number of recording channels required to collect magnetotelluric data as compared to conventional magnetotelluric techniques which have the same coverage. The magnetotelluric data collected according to the present invention can be processed using either conventional magnetotelluric techniques or EMAP processing techniques, thus greatly enhancing the utility of such data.

The present invention provides a novel method of magnetotelluric exploration as will be more clear in the figures and detailed description as well as the claims which are to follow.

DETAILED DESCRIPTION OF THE INVENTION

Figure 1:
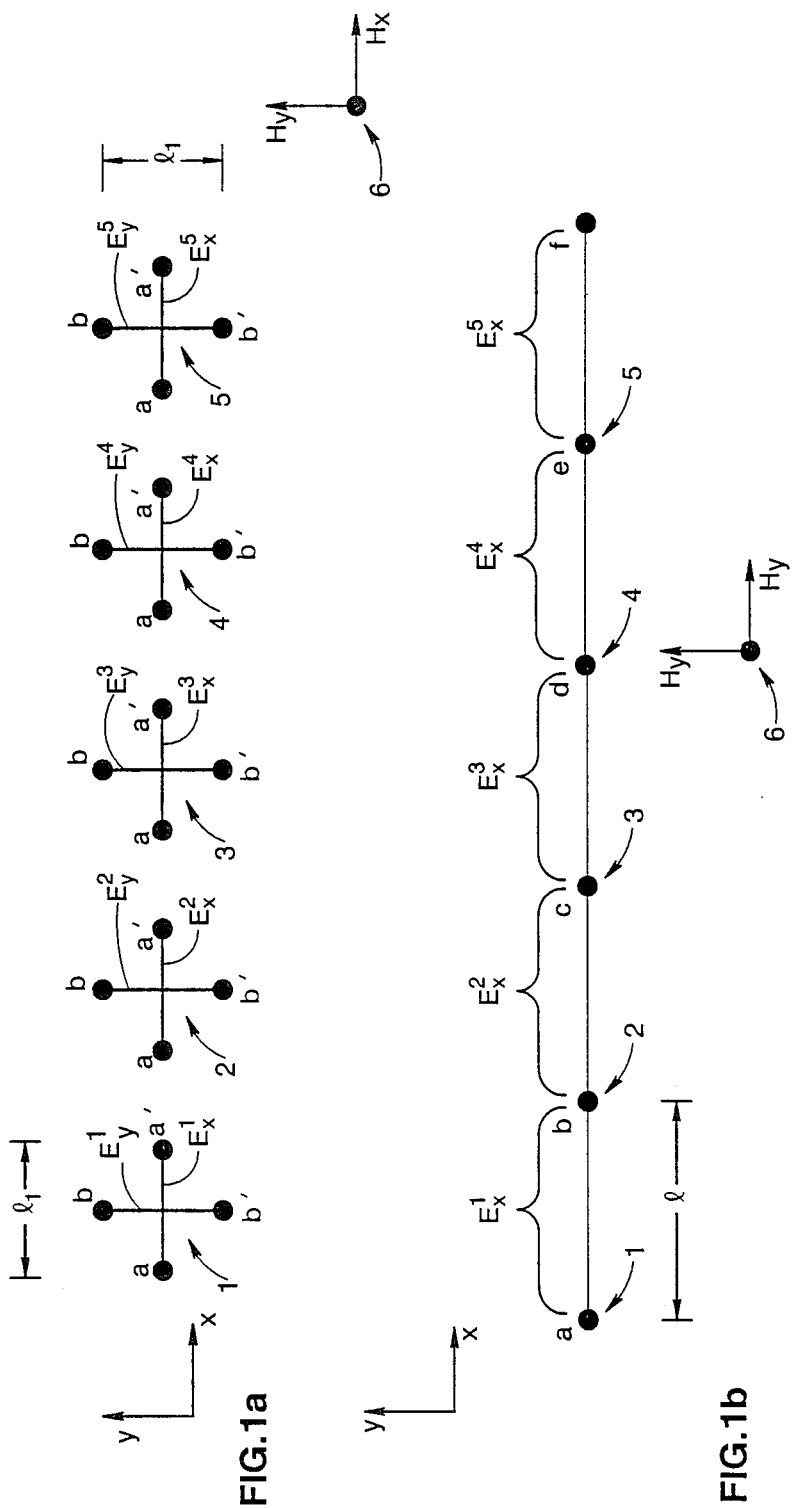
FIG. 1a is a representation of conventional magnetotelluric exploration.
FIG. 1b is a representation of the electromagnetic profiling (EMAP) technique of exploration.

The present invention relates generally to a method of geophysical exploration and more particularly to a novel method of magnetotelluric exploration.

To better understand the present invention, the following brief discussion of magnetotelluric exploration is provided. Generally, magnetotelluric exploration uses the propagation properties of electromagnetic waves in the earth's subsurface formations to obtain measures of the earth's resistivity as a function of depth. By simultaneously measuring two orthogonal components of the earth's magnetic field (e.g., $H_x$, $H_y$) and electric field (e.g., $E_x$, $E_y$), at the earth's surface, one can obtain a complete measure of the earth's impedance tensor. More formally, the electric field and magnetic field measurements can be related to elements of the earth's impedance tensor according to:

$$E_x = Z_{xx}H_x + Z_{xy}H_y \quad (1)$$

and $$E_y = Z_{yx}H_x + Z_{yy}H_y \quad (2)$$

where $E_x$ and $E_y$ are orthogonal electric dipole components of the earth's electric field;

$H_x$ and $H_y$ are orthogonal components of the earth's magnetic field; and $Z_{xx}$, $Z_{yy}$, $Z_{yx}$, as $Z_{xy}$ are elements of the earth's impedance tensor $Z_{ij}$.

This may be expressed more simply by the tensor relationship:

$$E_i = \sum_j z_{ij} H_j \quad (3)$$

Since equations (1) and (2), or more simply (3), include four unknowns ($Z_{xx}$, $Z_{xy}$, $Z_{yx}$, and $Z_{yy}$), solutions thereto can be obtained by collecting multiple sets of the electric field and magnetic field measurements so as to obtain a least squares fit solution to these equations. Having obtained measures of the elements of the impedance tensor $Z_{ij}$, those skilled in the art will appreciate that there exist well known techniques for obtaining estimates of the earth's resistivity structure therefrom.

Once solutions to equations (1) and (2), or more simply (3), have been found, one can determine the azimuthal angle of rotation $\Omega$ which minimizes the diagonal impedance tensor elements (i.e., $Z_{xx}$, $Z_{yy}$) and maximizes the off-diagonal impedance tensor elements (i.e., $Z_{xy}$, $Z_{yx}$). The angle of rotation $\Omega$ can then be used to synthetically rotate the acquisition coordinate system, along which the measurements of the earth's electric and magnetic fields were obtained, into a set of two orthogonal axes. One of the two orthogonal axes can then be aligned parallel with the strike direction of the earth's subsurface formations.

To determine which of the two orthogonal axes is parallel to the strike direction, a third orthogonal component of the earth's magnetic field can be used (i.e., $H_z$). The three orthogonal components of the earth's magnetic field ($H_x$, $H_y$, $H_z$) can be related according to:

$$H_z = T_x H_x + T_y H_y \quad (4)$$

where $T_x$ and $T_y$ are tipper functions.

The angle of rotation $\Omega$, which minimizes $T_y$ and maximizes $T_x$ can then be used to estimate the strike direction.

It has been discovered that the impedance tensor element $Z_{ij}$ solutions to equation (3) can be used to characterize the earth's subsurface formations. For earth models having only one-dimensional variations, the impedance tensor element $Z_{xx}$ or $Z_{yy}$ is 0 for any measurement direction and the impedance tensor elements $Z_{xy} = -Z_{yx}$. For two-dimensional variations, the magnitude of the impedance tensor elements $Z_{xy}$ and $Z_{yx}$ have a maximum or minimum parallel or perpendicular to the strike direction of a formation and the impedance tensor elements $Z_{xx}$ and $Z_{yy}$ are zero parallel to the strike direction and perpendicular the strike direction. For three-dimensional variations, there exist no special directions and all four impedance tensor elements $Z_{ij}$ are non-zero and are needed for evaluation of the earth's resistivity structure.

An important aspect of closely spaced conventional magnetotelluric exploration techniques is the collection of at least one set of two orthogonal components of the earth's magnetic field ($H_x$, $H_y$) and a plurality of sets of two orthogonal electric dipole components of the earth's electric field ($E_x$, $E_y$) at a plurality of discrete locations along a generally linear line of profile. Such a closely spaced conventional magnetotelluric method is depicted in FIG. 1a. In particular, it should be noted that such conventional magnetotelluric method includes a plurality of monitoring sites 1, 2, 3, 4, and 5 for sensing and recording two orthogonal electric dipole components (e.g., $E_x$, $E_y$) of the earth's electric field and at least one magnetometer site 6 for sensing and recording two orthogonal components (e.g., $H_x$, $H_y$) of the earth's magnetic field.

The electric dipole components measured and recorded at each monitoring site are obtained between a pair of electrodes spaced a selected distance one from another. For example, the electric dipole $E_y^1$ measured and recorded at site 1 of the y component of the electric field is the potential difference measured between electrodes b—b' separated by distance $l_1$. Similarly, the electric dipole $E_x$ measured and recorded at site 2 of the x component of the electric field is the potential difference measured between electrodes a—a' separated by distance $l_1$. In the above notation, the superscript associated with the electric dipole is a site indexing variable and the subscript indicates the axis along which the electric dipole is measured.

Since the earth's magnetic field varies more slowly as a function of spatial location than the earth's electric field, it is not necessary to sense and record components of the earth's magnetic field at every location at which the earth's electric field is sensed and recorded when closely spaced magnetotelluric-type exploration methods are used. As such, two components of the earth's magnetic field $H_x$, $H_y$ are sensed and recorded only at site 6. This fact permits a substantial reduction in the amount of cable and the number of recording channels required. However, this feature is generally common to all closely spaced magnetotelluric-type exploration methods.

Thus, it can be seen from FIG. 1a that the conventional magnetotelluric method can require a recording system having at least $2N+2$ recording channels (where N is the number of electric dipole monitoring sites) since two recording channels are needed to record two orthogonal electric dipole components of the earth's electric field (i.e., $E_x$ and $E_y$) at each monitoring site and at least two channels are needed to record the two orthogonal component of the earth's magnetic field (i.e., $H_x$, $H_y$) at at least one location in the vicinity of the area to be surveyed. Moreover, the total length of cabling required to measure the electric dipole components is $2 \cdot N \cdot l_1$, where $l_1$ is the interval between a pair of spaced electrodes over which the electric dipole is measured (e.g., a—a'). Consequently, the amount of cabling and the number of recording channels can become quite cumbersome, especially in view of the fact that magnetotelluric surveys can generally extend over several miles.

Looking next to FIG. 1b, the EMAP method of exploration is depicted along a line of profile having the same horizontal coverage as that of FIG. 1a. In particular, a plurality of electrodes (a, b, c, d, e and f) are embedded in the earth and separated by a distance l. The potential difference is measured between adjacent pairs of electrodes. In the notation used, the electric dipole $E_x^1$ represents the component of the earth's electric field along the x-axis measured between electrodes a and b, and recorded at sensing site 1. Two orthogonal components of the earth's magnetic field (e.g., $H_x$, $H_y$) are recorded at at least one magnetometer sensing site 6 in the vicinity of the area to be surveyed. The EMAP method can thus be seen to require a recording system having at least $N+2$ recording channels, where N is the number of monitoring sites. The total length of cable required to measure the electric dipole components of the earth's electric field is $N \cdot l$ where l is the interval between a pair of spaced electrodes (e.g., a and b, b and c, etc.) over which the electric dipole is measured. It should be noted that the electric dipole measurements are continuous, (i.e, the electric dipoles are measured over adjacent spaced intervals) unlike the discrete measures of the earth's electric field made in the conventional magnetotelluric method.

Since the EMAP method does not measure and record two orthogonal electric dipole components of the earth's electric field at each monitoring site, solutions to the complete impedance tensor of Equation (3) cannot be obtained. Rather, by constraining the line of profile to be generally perpendicular to the strike direction, the EMAP technique can provide a series of one-dimensional measures of the impedance tensor as previously discussed.

Looking now to FIG. 2, the present method of magnetotelluric exploration will be discussed. Unlike the magnetotelluric technique shown in FIG. 1a, only $N+1$ electric dipole components of the earth's electric field are sensed and recorded at N monitoring sites (1, 2, 3, 4, and 5) thus substantially reducing the number of recording channels needed to collect magnetotelluric data. The acquisition layouts of the closely spaced magnetotelluric method in FIG. 1a, the EMAP method in FIG. 1b, and the present invention in FIG. 2 have been depicted so as to represent having substantially the same coverage with the same number of monitoring sites. However, those skilled in the art will appreciate that the spacing $l_2$ between electrodes and the angles $\phi$ and $\beta$ in the present invention can be varied so as to produce a plurality of nonlinear arrays of electrodes along zig-zag lines.

In particular, a series of electric dipole measurements of the earth's electric field are obtained between adjacent pairs of electrodes (a and b, b and c, c and d, etc.) planted in the earth along a zigzag line. The electric dipole measurements of the earth's electric field are measured over adjacent spaced intervals so as to form a continuum of electric field measurements. With reference to the coordinate system ($\bar{x}_1$, $\bar{x}_2$) shown in FIG. 2, the following electric dipoles are measured and recorded, $E_1^1$, $E_2^2$, $E_1^3$, $E_2^4$...$E_j^n$. In the $E_j^n$ notation, the subscript j indicates the axis (either $\bar{x}_1$ or $\bar{x}_2$) along which the electric dipole is measured and the superscript n is a monitoring site indexing variable.

Figure 2:
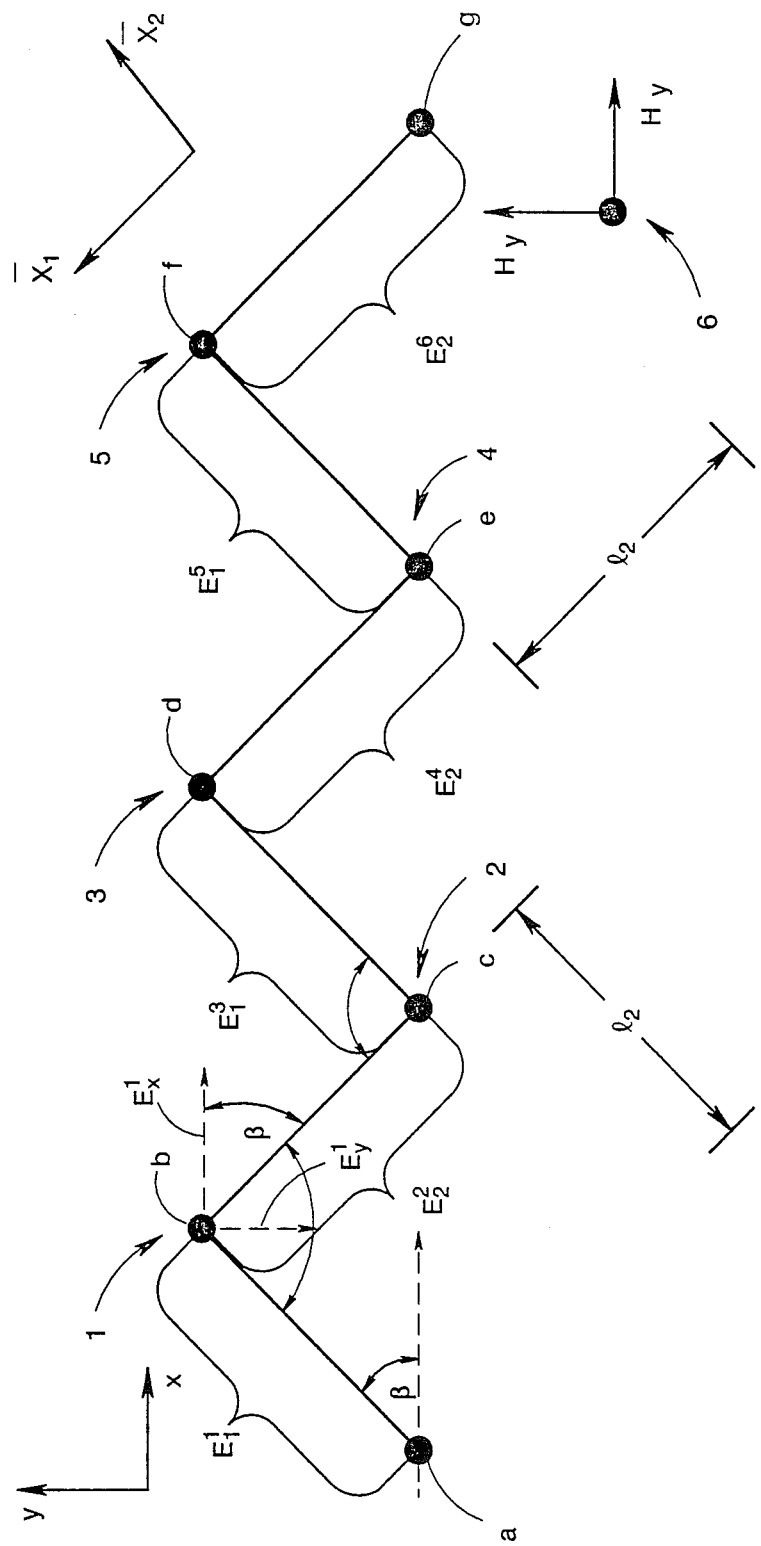
FIG. 2 is a method of magnetotelluric exploration according to the present invention.

For purpose of explanation only, the zigzag line of electrodes a, b, c, d, e, f, and g, as shown in FIG. 2, is uniform, i.e., the interval $l_2$ between adjacent electrodes (e.g., a and b) is fixed and the included angle $\phi$ between adjacent electric dipole measurements is fixed. Generally, the included angle $\phi$ should be $<180°$ and preferably $90° \leq \phi \leq 150°$. Additionally, the angle $\beta$ between each electric dipole measured and a generally straight line of profile is fixed. Although FIG. 2 depicts a regular zigzag array of electrodes (i.e., fixed intervals $l_2$ and fixed included angles $\phi$ and $\beta$ ), those skilled in the art will appreciate that a regular zigzag array of electrodes is merely exemplary of one particular nonlinear array out of a plurality of alternative nonlinear arrays.

Additionally, at least two orthogonal components of the earth's magnetic field ($H_x$ and $H_y$) can be measured at at least one magnetometer site 6 in the vicinity of the area to be surveyed, as shown in FIG. 2.

In FIG. 2, the first adjacent pair of electric dipole measurements (i.e., $E_1^1$ and $E_2^2$) can be transformed into two orthogonal components ($E_x^1$, $E_y^1$) for site 1 in the coordinate system ($\bar{x}$, $\bar{y}$), employing the following:

$$E_1^1 = E_x^1 \cos \beta + E_y^1 \sin \beta \qquad (5)$$
$$= E_x^1 = \sin \frac{\phi}{2} + E_y^1 \cos \frac{\phi}{2}$$

and $$E_2^2 = E_x^1 \cos \beta - E_y^1 \sin \beta \qquad (6)$$
$$= E_x^1 \sin \frac{\phi}{2} - E_y^1 \cos \frac{\phi}{2}$$

Where $\phi$ is the included angle between adjacent electric dipole measurements and $\beta$ is angle complementary to $\phi/2$.

Having resolved the electric dipoles $E_j^n$ measured between adjacent electrodes into two orthogonal components ($E_x$, $E_y$) and having simultaneously obtained a measure of two orthogonal components of the earth's magnetic field ($H_x$, $H_y$), in the vicinity of the area to be surveyed, Eq. (3) can now be solved for the complete impedance tensor $Z_{ij}$ with any one of several known techniques to obtain a measure of the earth's resistivity structure. In particular, the electric and magnetic field data, which are typically recorded as a function of time, can be transformed into functions of frequencies. Since the depth of penetration of the electromagnetic waves decreases with frequency, impedance as function of frequency can then be transformed to an measure of the earth's resistivity structure as a function of depth. The orientation of the subsurface formation strike direction can also be obtained from a rotation of the data fitted to Eq. (3) and Eq. (4).

The magnetotelluric data collected according to the present invention is amenable to both conventional magnetotelluric and EMAP processing techniques. Additionally, modified EMAP processing techniques can be applied to the magnetotelluric data so as to ameliorate undesirable near-surface effects, in the complete impedance tensor.

When the magnetotelluric method of the present invention is compared with the conventional magnetotelluric exploration method with the same density of measurement (as seen in FIG. 1a), the number of recording channels to collect convention magnetotelluric data is 2N+2, where N is the number of magnetotelluric recording sites and the total length of cable (for measuring the electric dipole measurements) is $2Nl_1$ where $l_1$ is the interval over which the electric dipole is measured. In the present method of magnetotelluric expiration the number of recording channels required to collect magnetotelluric data is N+3 (N+1 for electric dipoles and 2 for magnetic components), where N is the number of magnetotelluric recording sites and the length of cable required is $$\frac{(N+1)l_2}{\cos\beta}$$

where $l_2$ is the spacing between electrodes and $\cos\beta$ is defined in FIG. 2. Thus when compared to the conventional magnetotelluric method, the present method of magnetotelluric significantly reduces both the number of recording channels and length of cable required compared to conventional magnetotelluric exploration.

When compared to the EMAP method, the present method of magnetotelluric exploration increases slightly the number of recording channels and length of cable required to cover the same linear distance. However, such nominal increases in both the number of recording channels and the cable length allow the present invention to collect sufficient magnetotelluric data to obtain complete solutions for the impedance tensor $Z_{ij}$. The cable length required by the present invention to cover the equivalent of the (N-1) EMAP coverage is $(N+1)l_2/\cos \beta$. For $\beta=30°$, results in only a 15% increase in case length over the EMAP technique. Here, the spacing $l_2$ between electrodes is the same for both techniques and the angle $\beta$ is a measure of angle between a generally straight line of survey.

While a particular embodiment of the invention has been shown and described, it is understood that modification and changes thereto may be made without departing from the scope of the invention as set forth in the claims below.

I claim:

1. A method of magnetotelluric exploration, comprising:
   (a) measuring a first electric dipole representative of one component of the earth's electric field between first and second electrodes;
   (b) measuring a second electric dipole representative of one component of the earth's electric field between the second and a third electrode, wherein the included angle $\phi$ between the first and second adjacent components of the electric field is less than 180°;
   (c) measuring additional first and second components of the earth's electric field in an alternating array of adjacent electrodes forming a generally zigzag line; and
   (d) simultaneously, measuring at least two components of the earth's magnetic field at at least one location in the area to be surveyed.

2. The method of claim 1 wherein the included angle $\theta$ between measured adjacent components of the electric field is $90° \leq \phi \leq 150°$.

3. The method of claim 1 wherein the included angle $\phi$ is fixed and the resulting alternating array of adjacent electrodes forms a uniform zigzag line.

4. A method of magnetotelluric exploration comprising:
   (a) laying out a plurality of electrodes along a zigzag line;
   (b) simultaneously measuring electric dipole components of the earth's electric field between at least two selected adjacent pairs of electrodes along the zigzag line; and
   (c) concurrent with the measuring of the electric dipole components, measuring at least two orthogonal components of the earth's magnetic field in the vicinity of the area to be surveyed.

5. The method of claim 4 wherein the included angle $\phi$ between adjacent pairs of electrodes is less than 180°

6. The method of claim 4 wherein the included angle $\phi$ between adjacent pairs of electrodes is $90° \leq \phi \leq 150°$.

7. The method of claim 4 wherein the spacing between each electrode along the zigzag line is uniform. in the vicinity of the area to be surveyed.

8. A method of magnetotelluric exploration, comprising:
  (a) laying out an array of electrodes forming a zigzag line;
  (b) simultaneously measuring electric dipole components of the earth's electric field between at least two adjacent pairs of electrodes; and
  (c) concurrent with the measuring of the electric dipole components, measuring at least two orthogonal components of the earth's magnetic field in the vicinity of the area to be surveyed.

9. The method of claim 8 wherein the included angle $\phi$ between adjacent pairs of electrodes is less than 180°.

10. The method of claim 8 wherein the included angle $\phi$ between adjacent pairs of electrodes is $90° \leq \phi \leq 150°$.

11. The method of claim 8 wherein the spacing between each electrode along the zigzag line is uniform.

12. A method of processing magnetotelluric data comprising a plurality of electric dipole components of the earth's electric field, wherever each electric dipole component is obtained between adjacent pairs of spaced electrodes along a zigzag line, at least two orthogonal components of the earth's magnetic field obtained at at least one location in the area to be surveyed, comprising:
  (a) transforming adjacent pairs of electric dipole components of the earth's electric field into two orthogonal components of the earth's electric field; and
  (b) obtaining an estimate of the earth's resistivity structure from the two orthogonal components of the earth's magnetic and the two orthogonal components of the earth's electric field.

13. The method of claim 12 further including: obtaining an estimate of the principal axes of the earth's formation in the area surveyed.

14. The method of claim 12 further including: obtaining an estimate of the strike direction of the earth's formation on the area surveyed.

15. The method of claim 12 wherein the steps of transforming adjacent pairs of electric dipole component comprises:
  (a) transforming a first electric dipole component $E_1^1$ according to:

$$E_1^1 = E_x^1 \cos\phi/2 + E_y^1 \cos\phi/2;$$ and (b) transforming a second electric dipole component $E_2^2$ according to:

$$E_2^2 = E_x^1 \sin\phi/2 - E_y^1 \cos\phi/2$$

where $\phi$ is a measure of the angle between adjacent components and $E_x^1$ and $E_y^1$ are orthogonal components of the earth's electric field about a first site.

16. A method of magnetotelluric exploration, comprising:
  (a) obtaining a series of continuous electric dipole measurements of one component of the earth's electric field along a zigzag line; and
  (b) simultaneously obtaining at least two components of the earth's magnetic field in the vicinity of the zigzag line.

17. A method of magnetotelluric exploration, comprising the steps of:
  (a) obtaining a measure of one component of the earth's electric field between a series of electrodes implanted in the earth along a zigzag line; and
  (b) simultaneously obtaining a measure of at least two components of the earth's magnetic field in the vicinity of the zigzag line.

* * * * *

UNITED STATES PATENT AND TRADEMARK OFFICE
CERTIFICATE OF CORRECTION

PATENT NO. : 4,862,089

DATED : August 29, 1989

INVENTOR(S) : Richard F. Sigal

It is certified that error appears in the above—identified patent and that said Letters Patent is hereby corrected as shown below:

Column 5, line 16, "$E_x$" should read --$E^2_x$--.

Column 7, line 65, "$\cos \beta$" should read --$\beta$--.

Column 8, Claim 7, line 67, delete "in the vicinity of the area to be surveyed."

Signed and Sealed this

First Day of January, 1991

Attest:

HARRY F. MANBECK, JR.

*Attesting Officer*   *Commissioner of Patents and Trademarks*